(12) United States Patent
Di Biase

(10) Patent No.: US 11,723,311 B2
(45) Date of Patent: Aug. 15, 2023

(54) RADIO-CONTROLLED MOWER WITH CENTRAL AND SIDE CUTTING UNITS

(71) Applicant: MDB S.r.l. CON SOCIO UNICO, Lanciano (IT)

(72) Inventor: Mario Di Biase, Lanciano (IT)

(73) Assignee: MDB SRL, Lanciano (IT)

( * ) Notice: Subject to any disclaimer, the term of this patent is extended or adjusted under 35 U.S.C. 154(b) by 783 days.

(21) Appl. No.: 16/656,859

(22) Filed: Oct. 18, 2019

(65) Prior Publication Data
US 2020/0120865 A1  Apr. 23, 2020

(30) Foreign Application Priority Data

Oct. 18, 2018  (IT) ........................ 102018000009580

(51) Int. Cl.
| | |
|---|---|
| A01D 34/66 | (2006.01) |
| A01D 34/86 | (2006.01) |
| A01D 67/00 | (2006.01) |
| A01D 75/18 | (2006.01) |
| A01D 75/30 | (2006.01) |
| A01D 34/00 | (2006.01) |
| A01D 34/81 | (2006.01) |

(52) U.S. Cl.
CPC ......... *A01D 75/306* (2013.01); *A01D 34/008* (2013.01); *A01D 34/661* (2013.01); *A01D 34/863* (2013.01); *A01D 67/00* (2013.01); *A01D 75/185* (2013.01); *A01D 34/81* (2013.01)

(58) Field of Classification Search
CPC .. A01D 34/661; A01D 34/863; A01D 34/008; A01D 34/64; A01D 34/81; A01D 67/00; A01D 75/185; A01D 75/306; A01D 34/66; A01D 34/866; A01D 75/28; A01D 75/303; A01D 34/828; A01D 43/16
See application file for complete search history.

(56) References Cited

U.S. PATENT DOCUMENTS

| | | | | |
|---|---|---|---|---|
| 2,898,725 A | * | 8/1959 | Roesel ................. | A01D 34/733 56/294 |
| 2,960,811 A | * | 11/1960 | Roesel ................. | A01D 34/866 56/13.6 |
| 3,545,184 A | * | 12/1970 | Kuntze ................ | A01D 34/661 56/6 |
| 3,841,425 A | * | 10/1974 | Harkness ............. | F02B 75/16 180/300 |

(Continued)

FOREIGN PATENT DOCUMENTS

| | | |
|---|---|---|
| CN | 107333516 A | 11/2017 |
| EP | 2241172 A1 * 10/2010 | ............. A01D 34/74 |

(Continued)

OTHER PUBLICATIONS

Italian Search Report dated Oct. 8, 2019 for Italian application No. 201800009580; 7pgs.

*Primary Examiner* — Alicia Torres
*Assistant Examiner* — Madeline I Runco
(74) *Attorney, Agent, or Firm* — Ruggiero McAllister & McMahon LLC

(57) ABSTRACT

A radio-controlled mower has a frame, an engine unit, rolling bodies configured to move the frame over an area of ground, a central cutting unit, and side cutting units. The frame and the side cutting units are mutually movable.

14 Claims, 7 Drawing Sheets

(56) References Cited

U.S. PATENT DOCUMENTS

| | | | | |
|---|---|---|---|---|
| 4,104,851 | A * | 8/1978 | Perry | A01D 34/866 56/13.6 |
| 4,831,813 | A * | 5/1989 | Jonas | A01B 69/008 180/401 |
| 5,035,107 | A * | 7/1991 | Scarborough | A01D 43/16 56/13.6 |
| 5,704,201 | A * | 1/1998 | Van Vleet | A01B 33/16 56/6 |
| 5,823,569 | A * | 10/1998 | Scott | B62D 21/12 280/798 |
| 6,546,706 | B1 * | 4/2003 | Nafziger | A01D 43/16 56/13.7 |
| 6,779,325 | B1 * | 8/2004 | Robillard, II | A01D 34/82 56/12.7 |
| 6,786,030 | B2 * | 9/2004 | Nafziger | A01D 43/16 56/320.1 |
| 7,124,853 | B1 * | 10/2006 | Kole, Jr. | B62D 21/12 180/312 |
| 7,401,456 | B2 * | 7/2008 | Korthals | A01D 34/662 56/10.4 |
| 8,713,904 | B1 * | 5/2014 | Goudy | A01D 34/84 56/15.5 |
| 8,783,005 | B1 * | 7/2014 | Bernard | A01D 34/84 56/13.7 |
| 10,863,669 | B2 * | 12/2020 | Lartey | A01D 34/661 |
| 2002/0100266 | A1 * | 8/2002 | Greenwell | A01D 34/4161 56/15.8 |
| 2009/0249758 | A1 * | 10/2009 | Weeden | A01D 34/863 56/15.7 |
| 2016/0057924 | A1 * | 3/2016 | Asahara | A01D 34/64 180/312 |
| 2021/0345545 | A1 * | 11/2021 | Zhao | A01D 34/008 |
| 2021/0400877 | A1 * | 12/2021 | Zhao | A01D 34/66 |

FOREIGN PATENT DOCUMENTS

| | | | |
|---|---|---|---|
| EP | 2945037 A2 | 11/2015 | |
| EP | 2957162 A1 | 12/2015 | |
| GB | 2013073 A | 8/1979 | |
| NL | 7905005 A * | 12/1980 | A01D 34/66 |
| NL | 8602622 A * | 5/1988 | A01B 39/166 |
| WO | WO-2011115536 A1 * | 9/2011 | A01D 34/008 |
| WO | 2014007729 A1 | 1/2014 | |
| WO | WO-2017063539 A1 * | 4/2017 | A01D 34/008 |
| WO | WO-2019228461 A1 * | 12/2019 | A01D 34/008 |

* cited by examiner

RADIO-CONTROLLED MOWER WITH CENTRAL AND SIDE CUTTING UNITS

CROSS-REFERENCE TO RELATED APPLICATIONS

This patent application claims priority from Italian patent application no. 102018000009580 filed on Oct. 18, 2018, the entire disclosure of which is incorporated herein by reference.

TECHNICAL FIELD

This patent application relates to a mower, in particular a mower of the radio-controlled type.

STATE OF THE PRIOR ART

It is known to use a radio-controlled mower for mowing land, so as not to require the presence of the operator on the vehicle. Advantageously, the radio-controlled mower enables mowing rough terrain, such as slopes with steep inclines (for example, above) 20° without endangering the operator, who can operate the vehicle remotely.

However, known types of radio-controlled mowers have the drawback of not being able to adapt to all types of terrain and to easily avoid any obstacles along their path.

In addition, known types of radio-controlled mowers are unable to move close to obstacles such as a wall, a pole, a tree or similar objects.

Moreover, known types of radio-controlled mowers have the drawback of only mowing the portion of land that lies within their width. In other words, known types of mowers mow a smaller portion of land than that which they occupy, in particular than their width.

OBJECT OF THE INVENTION

The object of the present invention is to provide a mower that can easily adapt to all types of terrain and which is able to avoid and skirt around any obstacles.

The object of the present invention is to provide a radio-controlled mower that can also mow an area larger than its width in a single passage.

The object of the present invention is to provide an improved type of radio-controlled mower that overcomes the above-indicated problems.

According to the present invention, a radio-controlled mower is provided as set forth in claim 1 and, preferably, in any of the successive claims directly or indirectly dependent upon claim 1.

BRIEF DESCRIPTION OF DRAWINGS

The invention shall now be described with reference to the accompanying drawings, which illustrate a non-limitative embodiment thereof, in which.

PREFERRED EMBODIMENT OF THE INVENTION

Figure 1:
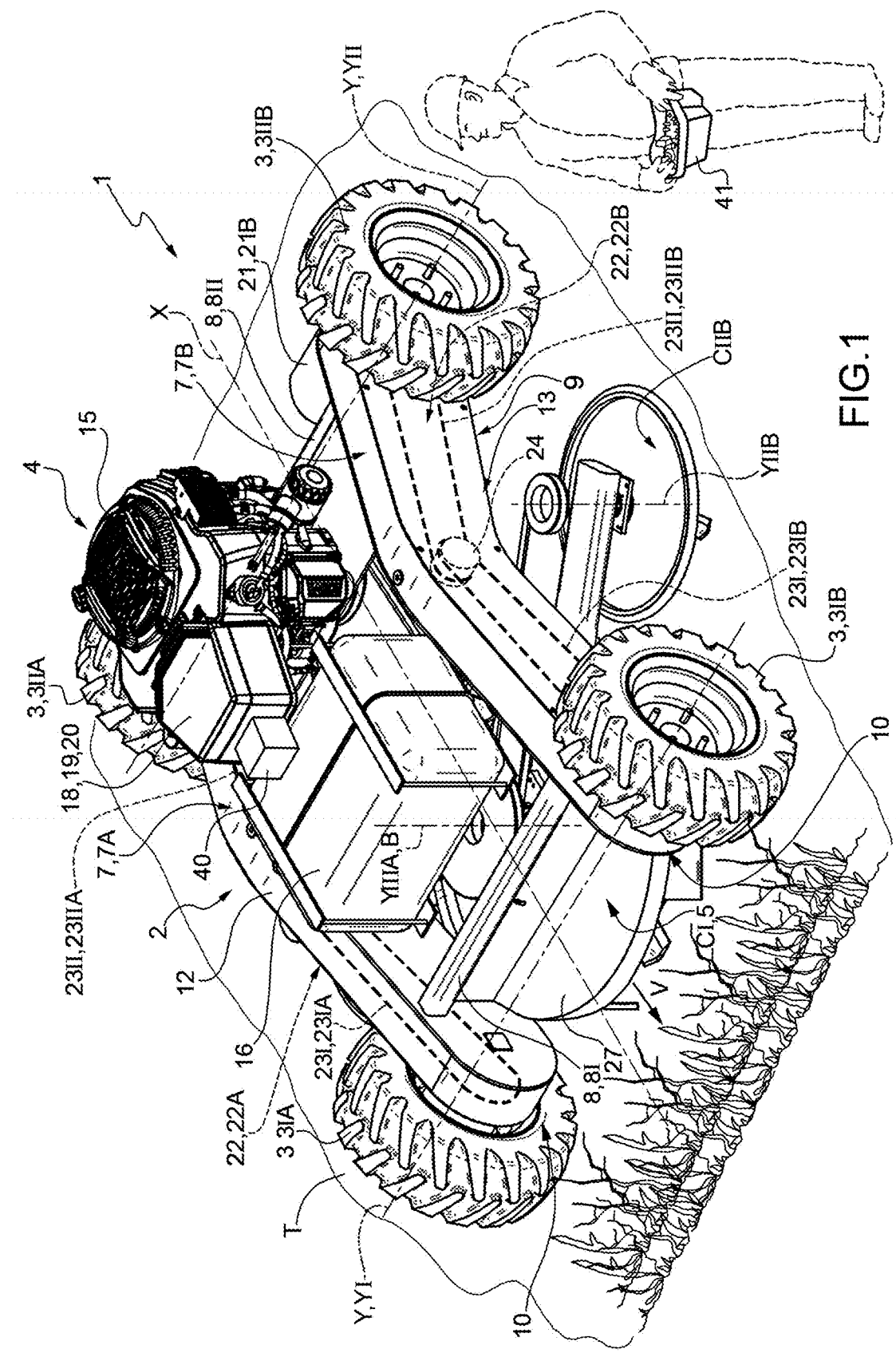
FIG. 1 is a perspective view, with some parts removed for greater clarity, of a radio-controlled mower according to the present invention.
Figure 2:
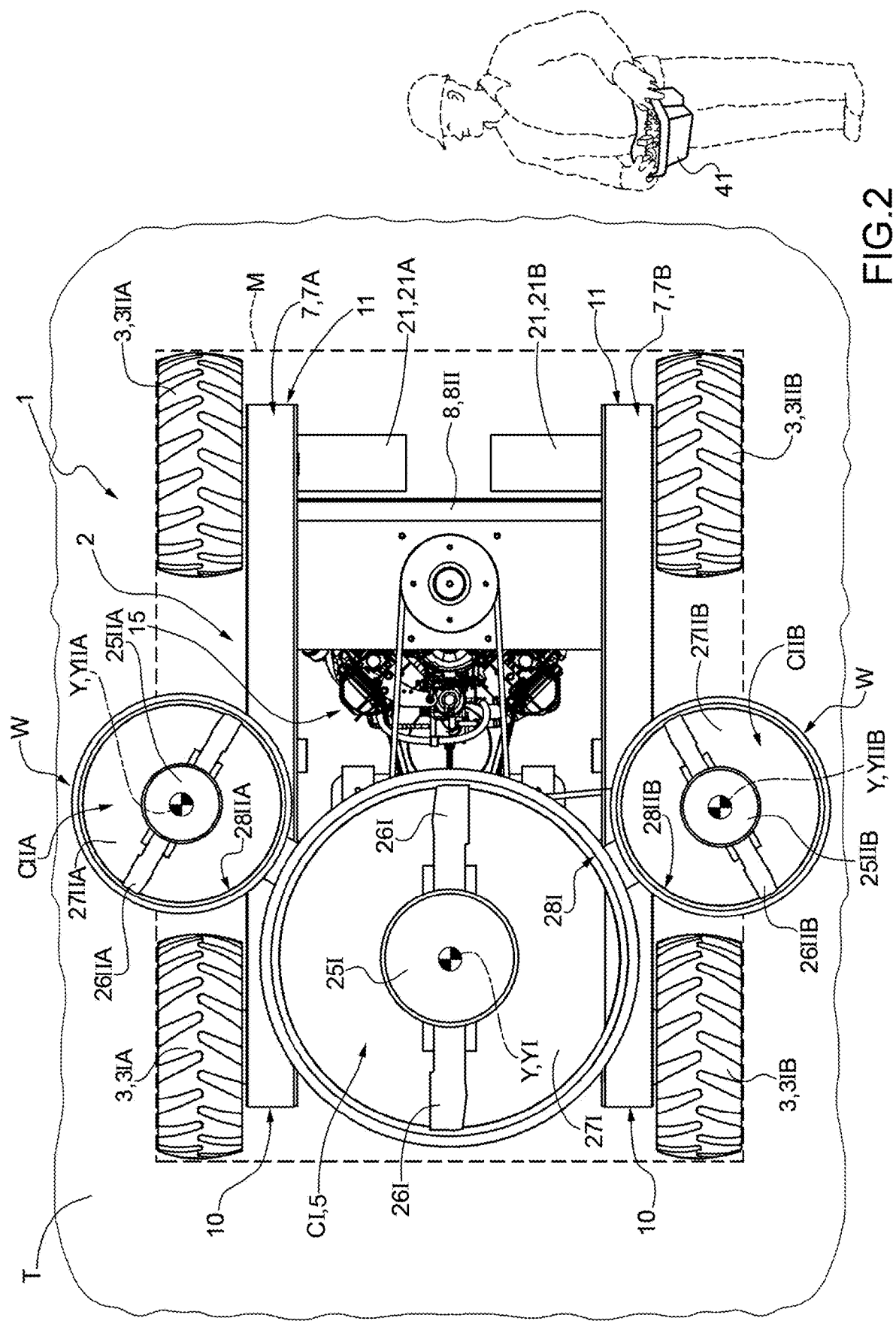
FIGS. 2 to 5 are views from below of the mower of FIG. 1, in respective different operating configurations.
Figure 3:
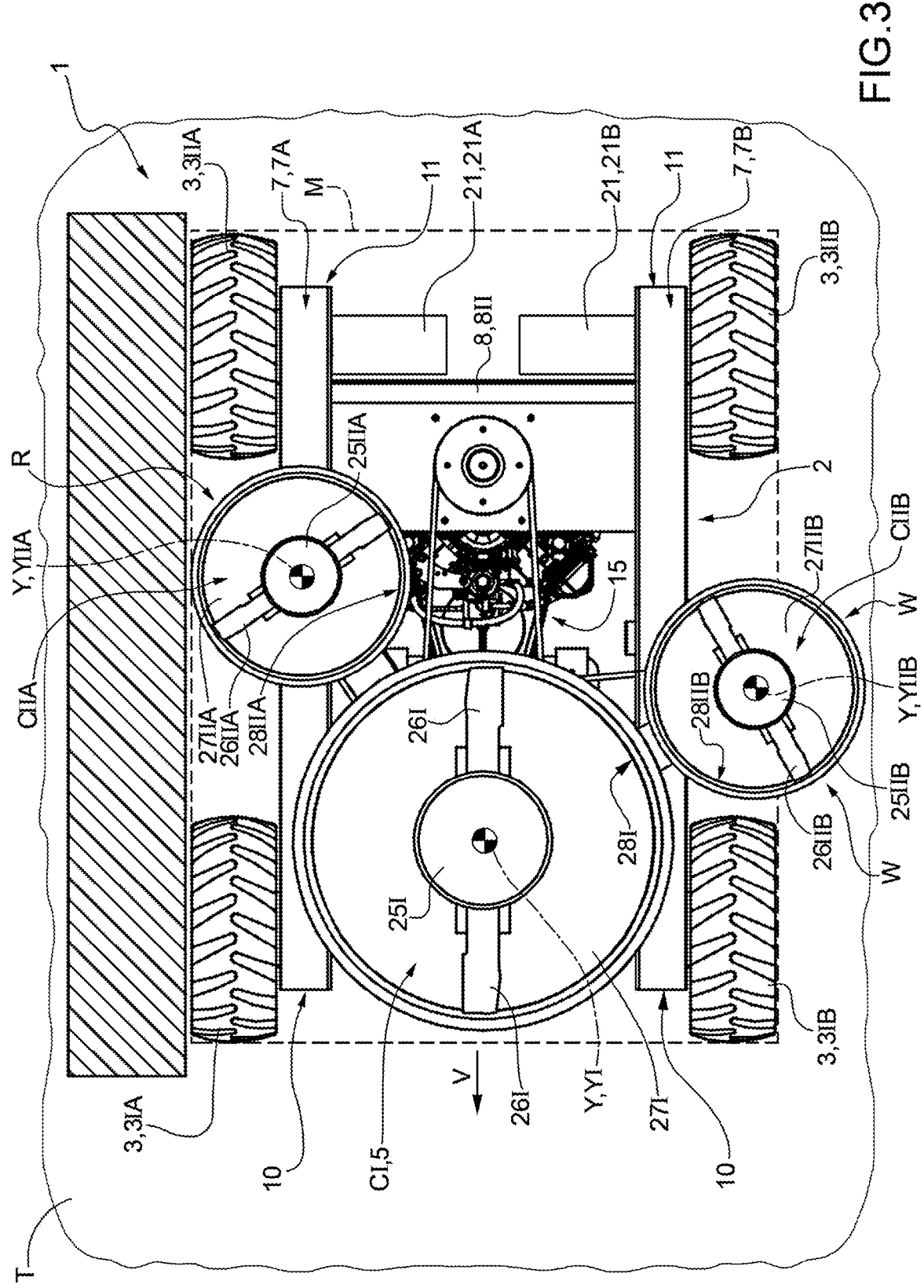
Figure 4:
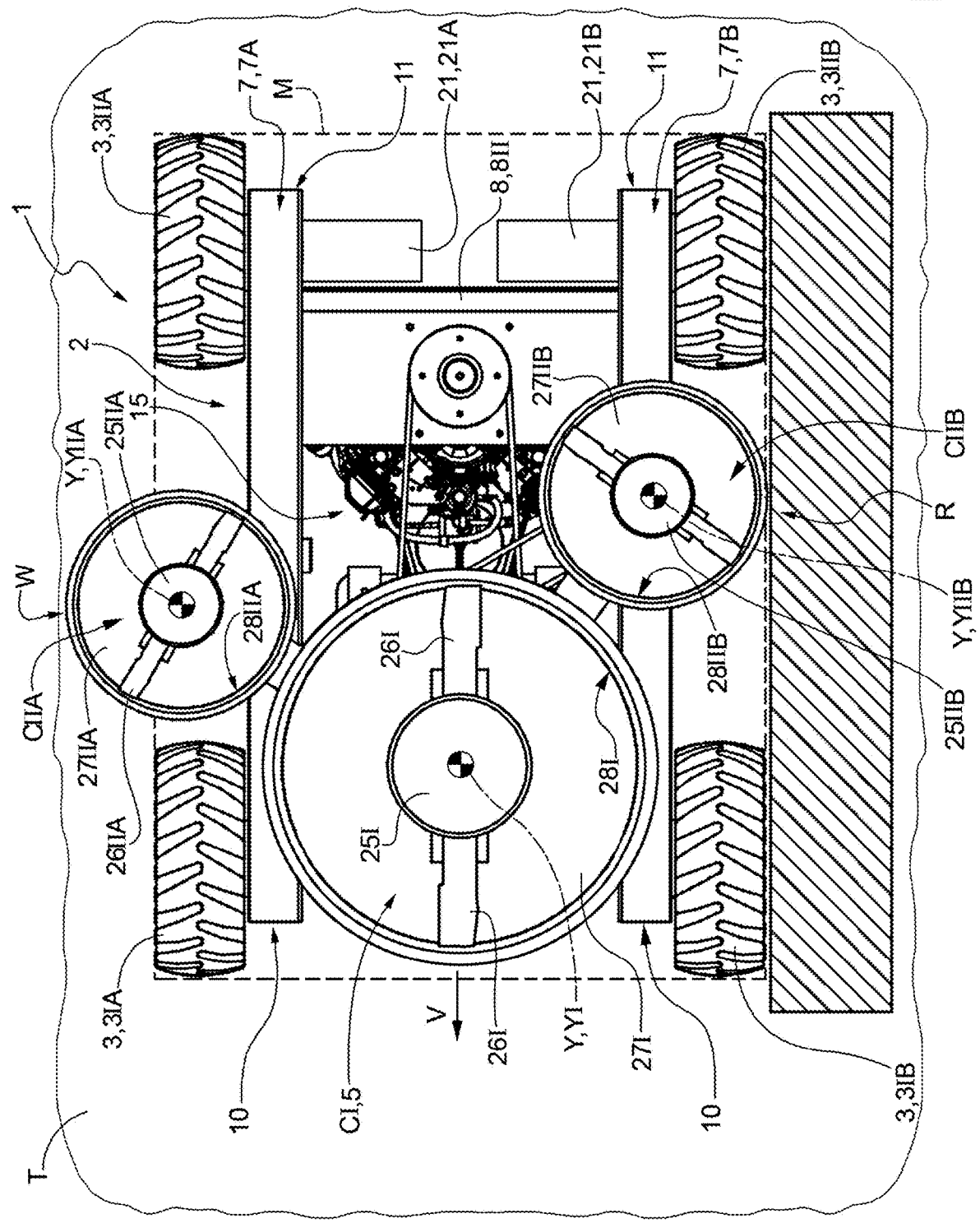
Figure 5:
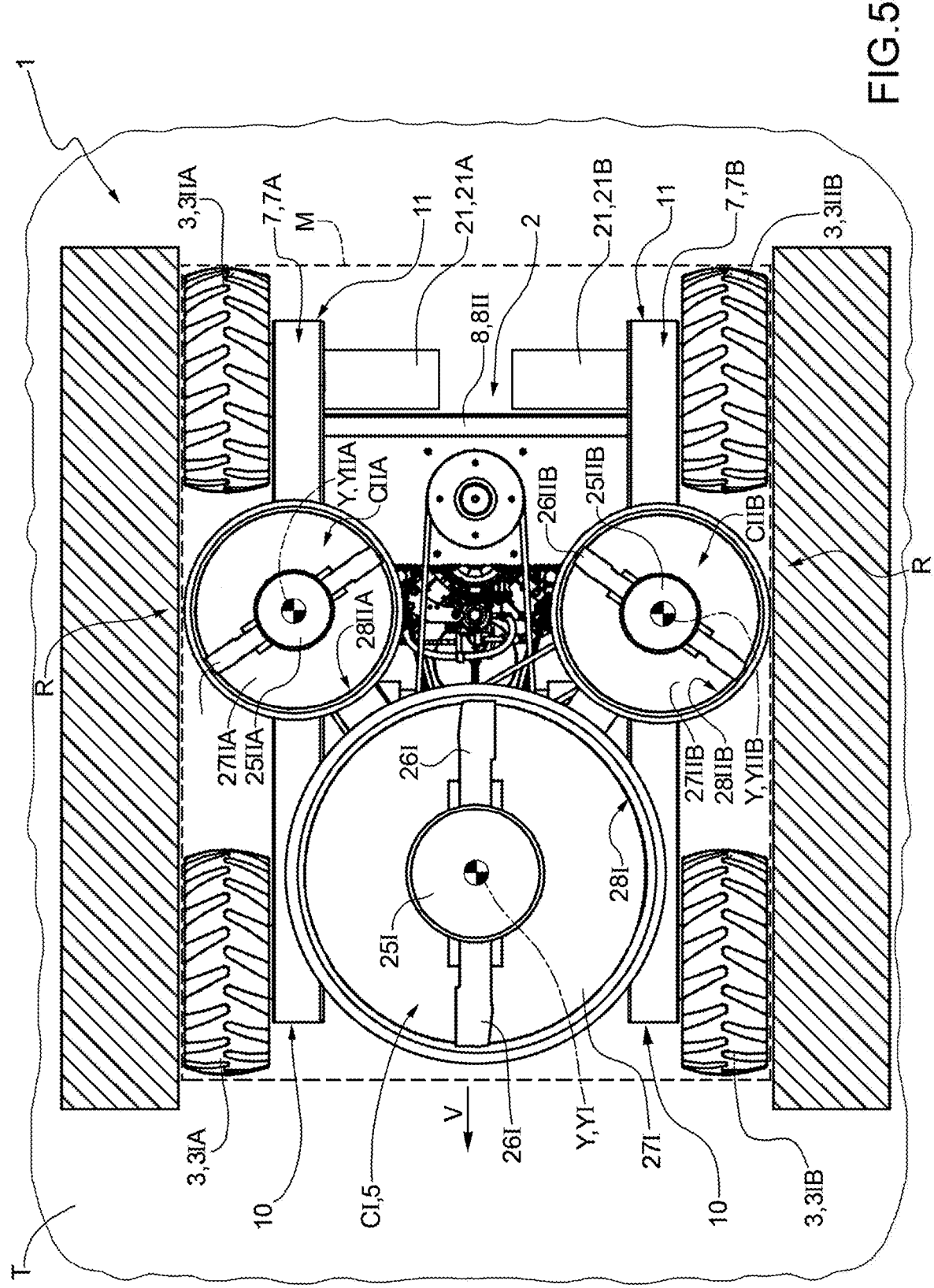

In the figures, reference numeral 1 indicates, as a whole, a radio-controlled mower that is configured for cutting grass, shrubs and bushes on an area of ground T.

It should be noted that hereinafter terms such as front, rear, left, right, upper and lower are used with reference to the radio-controlled mower 1, which moves on the ground T a forward direction of travel v. To distinguish between two substantially identical components, hereinafter the reference numbers of components to the right of the plane of symmetry of the radio-controlled mower 1 are identified by suffix A, while the reference numbers of the components to the left are identified by suffix B. In a similar manner, the reference numbers of the front components are identified by suffix I and the reference numbers of the rear components are identified by suffix II.

Figure 6:
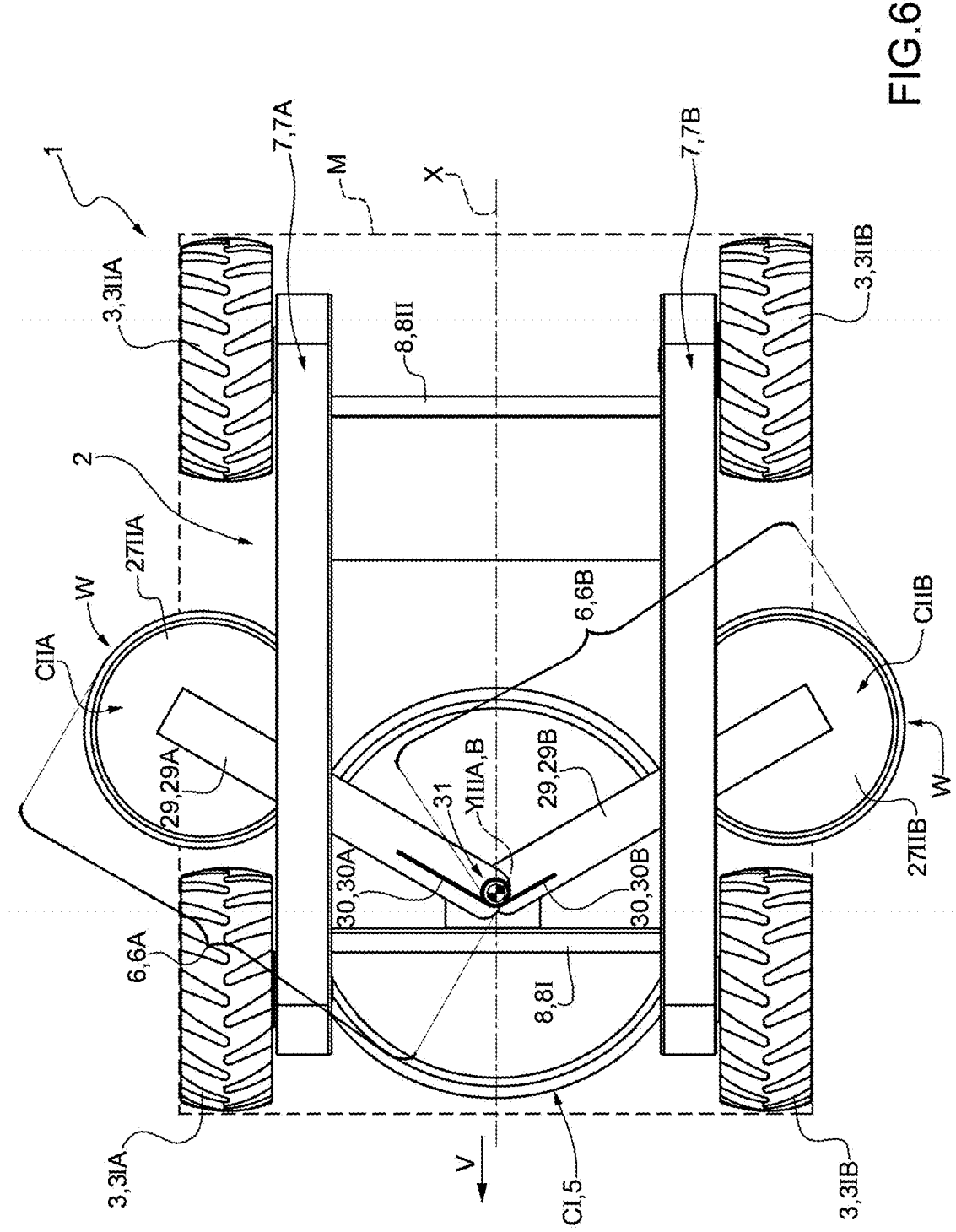
FIG. 6 is a plan view, with some parts removed for greater clarity, of the mower of FIG. 1.

As shown in FIG. 1, the mower 1 comprises: a frame 2 having a longitudinal axis X; rolling bodies 3, which support the frame 2 and enable movement of the mower 1 on the ground T; a engine unit 4; and a plurality of cutting units 5 and 6 (better seen in FIG. 6).

As shown in the figures, the frame 2 comprises, in turn, a right side member 7A and a left side member 7B, which are connected to one another by one or more cross-members 8. A front cross-member 8I and a rear cross-member 8II can be seen in the example shown.

Advantageously, the right side member 7A and the left side member 7B have a V or boomerang shape, and have a concavity 9 facing, in use, towards the ground T. Each side member 7A, 7B has a front end 10, a rear end 11 and a bend 12, which is made in a central area 13 of the respective right side member 7A or left side member 7B. The ends 10 and 11 of the side members and the central bend 12 are substantially the vertices of an imaginary triangle with its base parallel to the ground T.

Figure 7:
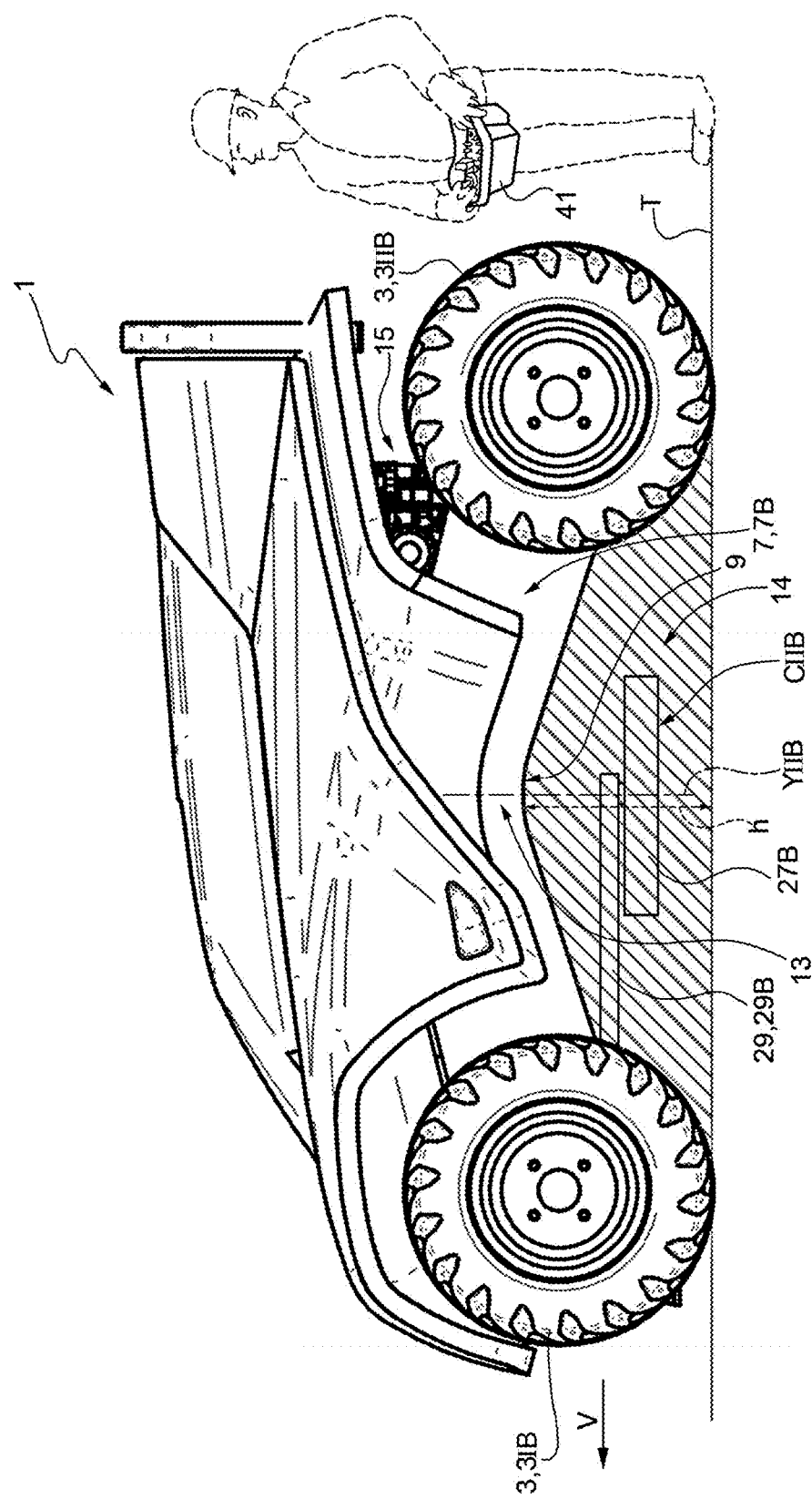
FIG. 7 is a side view of the mower of FIG. 1.

Due to the V-shape, the right side member 7A and the left side member 7B are raised above the ground T at the central area 13, so as to have a passage opening 14, schematically indicated in FIG. 7 by a hatched area, at the central area. The passage opening 14 has a height h, i.e. the distance between the bend 12 of each side member 7, 7A, 7B and the ground T, sufficient for the passage of a side cutting unit 6A or 6B. In use, each side cutting unit 6A, 6B passes through a respective passage opening 14 to move from the external position W to the internal position R, and vice versa.

Advantageously, the rolling bodies 3 of a side are synchronized with each other, as will be explained in greater detail below. In this way, it is possible direct the mower 1 by adjusting the speed of the rolling bodies 3 on the two sides.

As shown in the figures, the rolling bodies 3 are wheels. According to a variant that is not shown, the rolling bodies 3 can be tracks or similar systems. According to the example shown in the figures, the mower 1 comprises four wheels 3, two on each side.

Advantageously, each wheel 3 is a driving wheel. Due to the presence of at least one driving wheel 3 per side, it is possible to improve grip and towing force and, at the same time, the possibility of turning the mower 1.

Advantageously, turning of the mower is achieved through the difference in rotational speed of the driving wheels 3. In other words, the wheels 3 are not steerable.

Neither are the wheels 3 pivoting. In this way, it is possible to ensure better stability for the mower 1 and ensure a better grip on the ground T for its forward movement and for overcoming obstacles.

Advantageously, the engine unit 4 comprises: an endothermic engine 15; a tank 16; an alternator 18; an accumulation unit 19, which can in turn comprise one or more batteries 20; an electric motor 21 for each side of the mower 1; and a transmission system 22 for each side of the mower 1.

The endothermic engine 15 is an internal combustion engine, which can be diesel or petrol powered. The endothermic engine 15 is configured to drive, in use, the alternator 18, which in turn charges the accumulation unit 19 (i.e. the batteries 20).

Each electric motor 21 is powered by the accumulation unit 19.

According to a variant that is not shown, the engine unit 4 does not have an endothermic engine 15 and only has an accumulation unit 19 rechargeable externally or via other systems capable of generating electrical energy, for example photovoltaic panels and/or wind turbines and/or similar devices.

According to the example shown in the figures, the wheels 3 of a side of the mower 1 are both driven by a single electric motor 21 that is connected to one of the two wheels 3. According to the example shown, the mower 1 has two electric motors 21A, 21B, each of which is configured to drive a respective rear wheel 3 of the right side member 7A and of the left side member 7B, respectively.

In particular, for each side, an electric motor 21 is connected in a known manner to a respective wheel 3 to make it rotate about an axis of rotation Y, which is transversal to the longitudinal axis X of the frame 2. In the figures, YI indicates the axis of rotation Y of the pair of front wheels 3 and YII indicates the axis of rotation Y of the pair of rear wheels 3.

According to a variant that is not shown, the electric motors 21 can be alternate, namely one electric motor 21 can be connected to the front wheel 3 on one side, while the other electric motor 21 can be connected to the rear wheel 3 on the other side.

According to a variant that is not shown, the electric motors 21 are connected to both of the front wheels 3.

According to a variant that is not shown, the engine unit 4 comprises an electric motor 21 for each wheel 3.

As shown in the figures, each transmission system 22A, 22B comprises, in turn, a pair of chains 23I and 23II, and a transmission drum 24. In this way, the motion is transmitted from one wheel 3 to the other wheel 3 of the respective right side member 7A or left side member 7B.

Advantageously, the transmission drum 24 is mounted on the central area 13 of the respective side member, i.e. at the bend 12. In this way, it is possible follow the geometry of each side member 7 without obstructing the passage opening 14.

As shown in the figures, each front chain 23IA, 23IB is fitted on the transmission drum 24 and on a drum (of a known type and not shown) integral with the respective front wheel 3, 3I.

In a similar manner, each rear chain 23IIA, 23IIB is fitted around the transmission drum 24 and on a drum (of a known type and not shown) integral with the rear wheel 3, 3IIA, 3IIB.

As shown in FIG. 6, the mower 1 comprises: a central cutting unit 5, i.e. a cutting unit mounted between the right side member 7A and the left side member 7B; a right side cutting unit 6A; and a left side cutting unit 6B. The central cutting unit 5 is substantially connected to a front portion I of the frame 2.

According to the example shown, the central cutting unit 5 is supported by the front cross-member 81.

As shown in the figures, each cutting unit 5, 6A, 6B comprises a cutting head CI, CIIA, CIIB. In turn, each cutting head CI, CIIA, CIIB comprises: a respective blade support hub 25I, 25IIA, 25IIB (which hereinafter will be indicated simply as hub, for brevity), which is mounted rotatable about a respective vertical axis YI, YIIA, YIIB substantially perpendicular to the ground T; one or more cutting bodies 26I, 26IIA, 26IIB connected (in a known manner) to the corresponding hub 25I, 25IIA, 25IIB and rotatable about the respective vertical axis YI, YIIA, YIIB; and a shell 27I, 27IIA, 27IIB substantially coaxial to said vertical axis YI, YIIA, YIIB.

Each shell 27I, 27IIA, 27IIB is a cup-like body with the cavity facing the ground T; in particular, each shell 27I, 27IIA, 27IIB is configured, in a known manner, to create a corresponding cutting chamber 28I, 28IIA, 28IIB around the respective mower hub 25I, 25IIA, 25IIB and to contain any material that, in use, is projected radially around the mower hub 25I, 25IIA, 25IIB by the centrifugal force of the respective cutting bodies 26I, 26IIA, 26IIB.

Advantageously, the side cutting units 6A, 6B and the frame 2 are reciprocally movable. In particular, the side cutting units 6A, 6B are movable from an external position W to an internal position R, and vice versa. Each side cutting unit 6A, 6B can be positioned at will in any intermediate position between the external position W and the internal position R.

When each side cutting unit 6A, 6B is in the external position W, it protrudes, at least partially, laterally outside the frame 2 and the wheels 3. In other words, it protrudes outside a plan area M delimited laterally by the external profile of the wheels 3 of the mower 1. When each side cutting unit 6A, 6B is in the internal position R, it is positioned under the frame 2, i.e. it is contained within the plan area M delimited laterally by the external profile of the wheels 3 of the mower 1.

Advantageously, the size of the central cutting unit 5 is such as to ensure the mowing of the ground T between the front wheels 3IA and 3IB of the mower 1.

According to the example shown in FIG. 6, each side cutting unit 6A, 6B further comprises an arm 29A, 29B that supports the respective cutting head CIIA, CIIB. Each arm 29A, 29b is hinged to the frame 2 so as to be able to rotate about a vertical axis YIIA, YIIB. According to the example shown in FIG. 6, the arms 29A and 29B are hinged on a same axis YII. According to a variant that is not shown, the arms 29A and 29B are hinged about different axes YIIA and YIIB.

Each side cutting unit 6A, 6B further comprises a positioning element 30A, 30B to adjust the position of the respective arm 29A, 29B about the respective axis YIIIA, YIIIB. According to the example shown in FIG. 6, each positioning element 30A and 30B is a respective end of a torsion spring 31 coaxial to axes YIIIA, YIIIB.

According to the example shown in FIG. 6, the torsion spring 31 exerts a moment P on each arm 29 so as to push it towards the external position W.

According to a variant that is not shown, the positioning element is part of a drive device, for example an electric motor, which can be remotely operated via the remote control 41. In this case, it is possible to adjust, according to usage needs, the position of each arm 29 about the respective axis YIII and keep this position fixed during forwards travel of the mower 1.

Advantageously, each shell 27I, 27IIA, 27IIB is mounted rotatable about the respective vertical axis YI, YIIA, YIIB.

In this way, in use, jamming of the mower 1 is avoided in cases where a cutting unit 5, 6A, 6B strikes against an obstacle.

The mower hubs 25I, 25IIA, 25IIB of the cutting units 5, 6A, 6B are simultaneously driven by a belt transmission system 22 driven by the endothermic engine 15. Alternatively, according to a variant that is not shown, the cutting units 5, 6A, 6B can be driven in a different manner, for example by single electric motors.

The mower 1 further comprises a control unit 40 and a remote control 41 configured to remotely operate the radio-controlled mower 1. The remote control 41 has a user interface for command input exchange with an operator. The control unit is connected to and exchanges operating parameters with the endothermic engine 15 and each electric motor 21. The operating parameters comprise: the direction of travel v of the rolling bodies 3 on each side, and the speed of rotation of the rolling bodies 3 on each side.

In use, the mower 1 is remotely operated via the remote control 41.

During use, the positioning elements 30A, 30B push the side cutting units 6A, 6B into the external position W, i.e. they protrude laterally outside the mower 1. In this way, with a single pass, the mower 1 is able to mow a portion of ground T wider than its own width.

During use, in the case where a side cutting unit 6A, 6B encounters an obstacle, the respective shell 27IIA, 27IIB strikes against the obstacle, causing the rotation of the respective arms 29A, 29B towards the inside, i.e. inside the plan area M of the mower 1.

Each cutting unit 6A, 6B passes through the respective opening 14A, 14B when moving back inside the plan area M.

Therefore, in the event of encountering an obstacle, the mower 1 advantageously succeeds in continuing to mow the grass around the obstacle without interrupting its travel.

Given that each shell 27I, 27IIA, 27IIB of each cutting unit 5, 6A, 6B is mounted rotatable about a vertical axis YI, YIIA, YIIB, when a shell 27I, 27IIA, 27IIB touches an obstacle, it advantageously rotates, following the forward movement of the mower 1. In this way, each shell 27I, 27IIA, 27IIB rotates with respect to the obstacle, minimizing, or even preventing, wear due to contact with the obstacle.

Once the obstacle has been passed, each positioning element 30A, 30B rotates the respective arm 29A, 29B so as to bring the respective cutting head CIIA, CIIB to the external position W.

From the foregoing, it follows that the radio-controlled mower 1 of the above-described type enables mowing a portion of ground wider than its own width in a single pass.

In this way, it is possible mow an area of ground T more quickly, as the number of passes required is less than those of known types of mowers.

Furthermore, the fact that the side cutting units 6A, 6B are movable with respect to the frame 2 enables obstacles to be directly avoided, without needing to interrupt or change the direction of travel of the mower 1, and also enables mowing the ground T alongside the obstacles.

The fact that the wheels 3 are driving wheels ensures greater grip and resistance of the mower 1. The fact that the mower 1 does not have steering, but that the direction of travel is set by the difference in driving force of the wheels 3 on each side, enables greater grip and ensures the correct direction of the mower 1 on any type of ground T. In other words, this mower 1 does not pose the risk of the wheels 3 getting stuck in the ground T, as can happen with known types of mowers. Furthermore, this enables to easily interchange the wheels with a kinetic unit that may, for example, comprise tracks.

The invention claimed is:

1. A mower, the mower comprising:
a frame having a right side member, a left side member, and a pair of cross members,
wherein each side member has an upside-down V-shape with a first end, a second end opposite the first end, and an apex of the upside-down V-shape between the first and the second end,
wherein the pair of cross members connect the right side member to the left side member at the first and second ends of the upside-down V-shape;
left side rolling bodies connected at the first and second ends of the left side member;
right side rolling bodies connected at the first and second ends of the right side member,
wherein the left side rolling bodies and the right side rolling bodies support the frame and are configured to move the frame over an area of ground,
wherein the left side rolling bodies and right side rolling bodies define a defined area therebetween;
an engine unit disposed on the frame,
wherein the engine unit comprises a first electric motor that drives at least one of the left side rolling bodies and a second electric motor that drives at least one of the right side rolling bodies;
a central cutting unit having a cutting body rotatable about a central axis,
wherein the central cutting unit is connected to one of the cross members at a location between the right side member and left side member;
a left arm member connected to be rotatable about the central axis at a first end of the left arm member;
a left side cutting unit connected to the left arm member at a second end of the left arm member that is opposite the first end of the left arm member;
a right arm member connected to be rotatable about the central axis at a first end of the right arm member;
a right side cutting unit connected to the right arm member at a second end of the right arm member that is opposite the first end of the right arm member,
wherein the left side cutting unit and the right side cutting unit are mutually movable about the central axis by a positioning element,
wherein the central cutting unit, the left side cutting unit, and the right side cutting unit are driven by the engine; and
a control unit in operative connection with the engine unit and radio-controllable by a remote control configured to remotely operate the mower.

2. The mower according to claim 1, wherein the left and right side cutting units each comprise a cutting head that comprises a blade support hub rotatable around a respective vertical axis and a shell mounted to be rotatable about the respective vertical axis.

3. The mower according to claim 1, wherein the central cutting unit comprises a cutting head that comprises a blade support hub rotatable around the central axis and a shell mounted to be rotatable about the central axis.

4. The mower according to claim 1, wherein the left arm member and right arm member are reciprocally biased by the positioning element about the central axis toward an external position in which a portion of the left side cutting unit and/or a portion of the right side cutting unit lies outside the defined area and mutually movable about the central axis to be entirely within the defined area.

5. The mower according to claim 1, wherein the left arm member and right arm member are selectively positionable by the positioning element between an internal position in which a portion of the left side cutting unit and/or a portion of the right side cutting unit lies outside the defined area and an internal position in which the left side cutting unit and/or the right side cutting unit are entirely within the defined area.

6. The mower according to claim 1, further comprising a left side transmission system and a right side transmission system, wherein the left side transmission system transfers motion to the left side rolling bodies and the right side transmission system transfers motion to the right side rolling bodies.

7. The mower according to claim 6, wherein each of the left and right side transmission systems comprise a chain and a transmission drum, and wherein each transmission system follows a profile of the V-shape of the respective side member.

8. The mower according to claim 1, wherein the remote control has a user interface for command input exchange by an operator.

9. The mower according to claim 1, wherein the control unit is operatively connected to exchange operating parameters with the engine and each electric motor.

10. The mower according to claim 1, wherein the control unit is configured to control a direction of travel of the mower and a speed of rotation of the rolling bodies.

11. The mower according to claim 10, wherein the direction of travel is controlled by a difference between a driving force of the left side and right side rolling bodies.

12. The mower according to claim 1, wherein the first electric motor drives all left side rolling bodies and the second electric motor drives all right side rolling bodies.

13. The mower according to claim 1, wherein the left side rolling bodies and the right side rolling bodies are wheels.

14. The mower according to claim 1, wherein the positioning element is a spring.

* * * * *